United States Patent [19]

Beaverson

[11] Patent Number: 4,698,685
[45] Date of Patent: Oct. 6, 1987

[54] APPARATUS AND METHOD FOR CORRECTING CCD PIXEL NONUNIFORMITIES

[75] Inventor: Gregory K. Beaverson, Wrightsville, Pa.

[73] Assignee: RCA Corporation, Princeton, N.J.

[21] Appl. No.: 867,432

[22] Filed: May 28, 1986

[51] Int. Cl.[4] .................. H04N 5/14; H04N 5/30
[52] U.S. Cl. .................. 358/213.15; 358/213.17; 358/163
[58] Field of Search .............. 358/213, 167, 163, 168, 358/174

[56] References Cited

U.S. PATENT DOCUMENTS

| | | | |
|---|---|---|---|
| 4,234,890 | 11/1980 | Astle et al. | 358/163 |
| 4,392,157 | 7/1983 | Garcia et al. | 358/163 |
| 4,414,573 | 11/1983 | Griesshaber et al. | 358/163 |
| 4,454,545 | 6/1984 | Duschl | 358/213 |
| 4,523,229 | 6/1985 | Kanmoto | 358/163 |
| 4,544,952 | 10/1985 | Pham van Cang | 358/163 |
| 4,553,164 | 11/1985 | Labb | 358/163 |
| 4,586,082 | 4/1986 | Wilkinson | 358/163 |
| 4,590,520 | 5/1986 | Frame et al. | 358/163 |
| 4,614,966 | 9/1986 | Yunoki et al. | 358/221 |

Primary Examiner—Gene Z. Rubinson
Assistant Examiner—Stephen Brinich
Attorney, Agent, or Firm—E. M. Whitacre; D. H. Irlbeck; L. L. Hallacher

[57] ABSTRACT

Nonuniformities in the pixel of a CCD are corrected by storing a correction value for every pixel of the CCD. The pixel values from the CCD are transferred to a multiplier. The correction values are also transferred to the multiplier in synchronization with the transfer of the pixel values. The correction values and the pixel values are multiplied to produce a corrected pixel value for every pixel of the CCD. The corrected pixel values are transferred to an image processor for appropriate data processing.

8 Claims, 4 Drawing Figures

APPARATUS AND METHOD FOR CORRECTING CCD PIXEL NONUNIFORMITIES

BACKGROUND

This invention relates generally to systems using charge coupled devices (CCD's) and particularly to an apparatus and method for correcting for CCD pixel nonuniformities.

The use of charge coupled devices (CCD's) in imaging, measuring and inspecting systems is rapidly increasing in industry. In such systems, the object being investigated is illuminated with light which is focused onto the surface of the CCD. The pixels of the CCD charge to various levels in accordance with the intensity of light received from the object. The pixel levels are then transferred to an image processor and can be used to measure, or inspect, many parameters of the imaged object.

An example of a system using a charge coupled device is described in U.S. Pat. No. 4,454,545. The system described in this patent is used to inspect the phosphor screens on kinescope faceplates for blemishes prior to mating the faceplate with a funnel portion. The CCD used in the system described in the patent, and which can be used with the present invention, is an RCA SID 52501 CCD. This CCD has 320 vertical columns of pixels and 512 horizontal rows of pixels and, therefore, has a total of 163,840 pixels. CCD's with higher numbers of pixels are presently available. Because of the large number of pixels, it is extremely difficult, if not impossible, to manufacture CCD's in which all pixels have a uniform response to a given intensity of light. Accordingly, the nonuniformities of the pixels contribute to the overall noise of the system utilizing the CCD and result in a decrease in the sensitivity of the system. For this reason, various software correction techniques have been devised in an effort to compensate for the nonuniformities. Typically, off-line software correction techniques are utilized to correct approximately ten percent of the worst pixels. Only a small percentage of the pixels are corrected because the off-line correction of all pixels takes an unacceptable amount of processing time. However, this technique leaves uncorrected a large number of pixels which preferably should be corrected. For these reasons there is a need for an on-line system and method for correcting for 100% of the pixel nonuniformities while simultaneously eliminating the time required for off-line correction. The present invention fulfills these long felt needs.

SUMMARY

A method of correcting for nonuniformities of the pixels of a charge coupled device (CCD), wherein the pixels are charged to various pixel levels, includes storing a correction value for each pixel of the CCD in a central processing unit (CPU). The pixel levels from the CCD are transferred to a multiplier. The correction values are temporarily stored in a temporary storage unit. The correction values are transferred from the temporary storage unit to the multiplier in synchronization with the transfer of the pixel levels. Each pixel level is multiplied by a correction value to produce a corrected pixel value for every pixel of the CCD. The corrected pixel values are transferred to an image processing unit.

DETAILED DESCRIPTION

Figure 1:
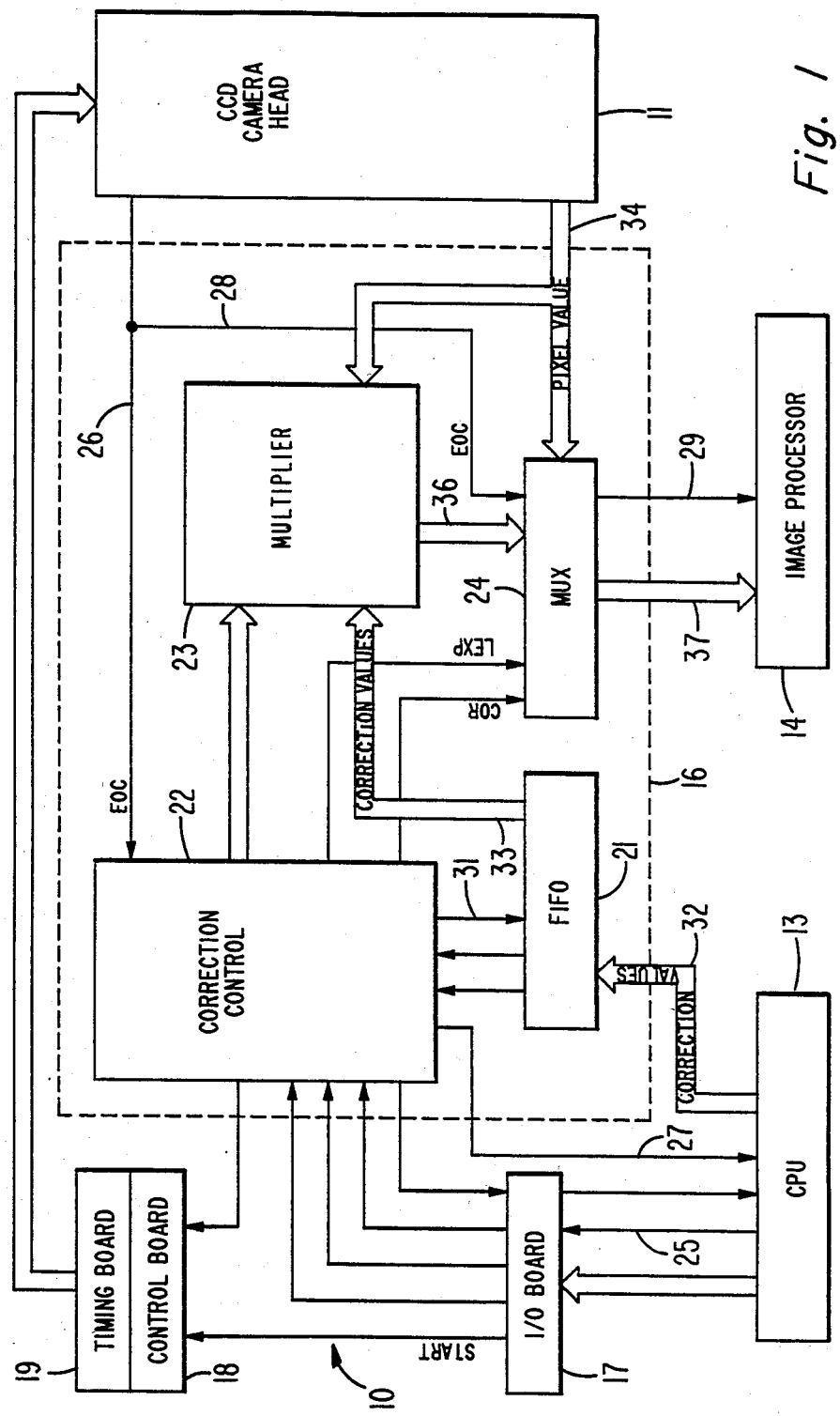
FIG. 1 is a block diagram of a preferred embodiment incorporated into a blemish detection system shown in simplified form.

In FIG. 1, a system 10, which is a simplified showing of the blemish detection system described in U.S. Pat. No. 4,454,545, includes a camera 11 in which a CCD is the imaging medium. The system 10 includes a central processing unit (CPU) 13 in which a correction value is stored for every pixel of the CCD in the camera 11. The system 10 also includes an image processor 14 in which the pixel data from the camera 11 are processed in the desired manner. The CPU 13 controls the image processor 14, the CCD camera 11, and a novel pixel correction apparatus 16 through an IO board 17, a control board 18, and a timing board 19 in a manner within the purview of those skilled in the art, and as fully described in U.S. Pat. No. 4,454,545. The pixel correction apparatus 16 includes a temporary storage unit (FIFO) 21, a correction control 22, a multiplier 23 and a multiplex circuit (MUX) 24.

In operation, the central processing unit 13 stores the correction values for each pixel of the CCD in the camera 11. The CPU 13 typically controls the image processor 14 to perform the desired inspection or test. The CPU 13 typically is also utilized to perform other tasks, such as loading and unloading panels from the inspecting equipment, storing the results of the inspection, and performing other control functions of the system. The pixel correction values stored in the CPU 13 are transferred to the FIFO 21 during the same time intervals that the pixel values are transferred from the camera 11 to the multiplier 23. The object being inspected (not shown) is imaged onto the CCD within the camera 11 when a start signal is provided on an output line 25 of the CPU 13. A pixel ready signal on output line 26 of the camera 11 informs the correction control 22 that the object has been imaged onto the CCD, and a pixel value is ready for transfer to the multiplier 23. The pixel ready signal on the line 26 is also applied to the multiplex circuit 24 by way of a line 28. An end of scan signal is provided to the CPU 13, by the correction control 22 via a line 27. The multiplex circuit 24 informs the image processor 14 when data are ready for transfer by way of the line 29. The correction control 22 also informs the FIFO 21, by way of a line 31, that correction values from the CPU 13 will be forthcoming shortly from a line 32. The correction values stored within the CPU 13 are transferred to the FIFO 21 by way of a bus bar 32. The correction values are transferred from the FIFO 21 to the multiplier 23 by way of a bus bar 33. Simultaneously, the pixel values from the CCD within the camera 11 are transferred to the multiplier 23 by a bus bar 34. The transfer of the correction values from the FIFO to the multiplier 23, and of the pixel values from the CCD to the multiplier 23, are synchronized so that every pixel value is multiplied by an individual correction value previously calculated for every pixel. The corrected pixel values are then transferred through the multiplexer 24 to the image processor 14 by buses 36 and 37.

The output bus 34 of the CCD camera 11 is also directly coupled to the multiplexer 24. As explained hereinafter, the correction values stored in the CPU 13 are generated by averaging pixel values from a number of exposures of the CCD. The ability to input the pixel values directly to the image processor is very useful in performing such averaging.

Figure 2:
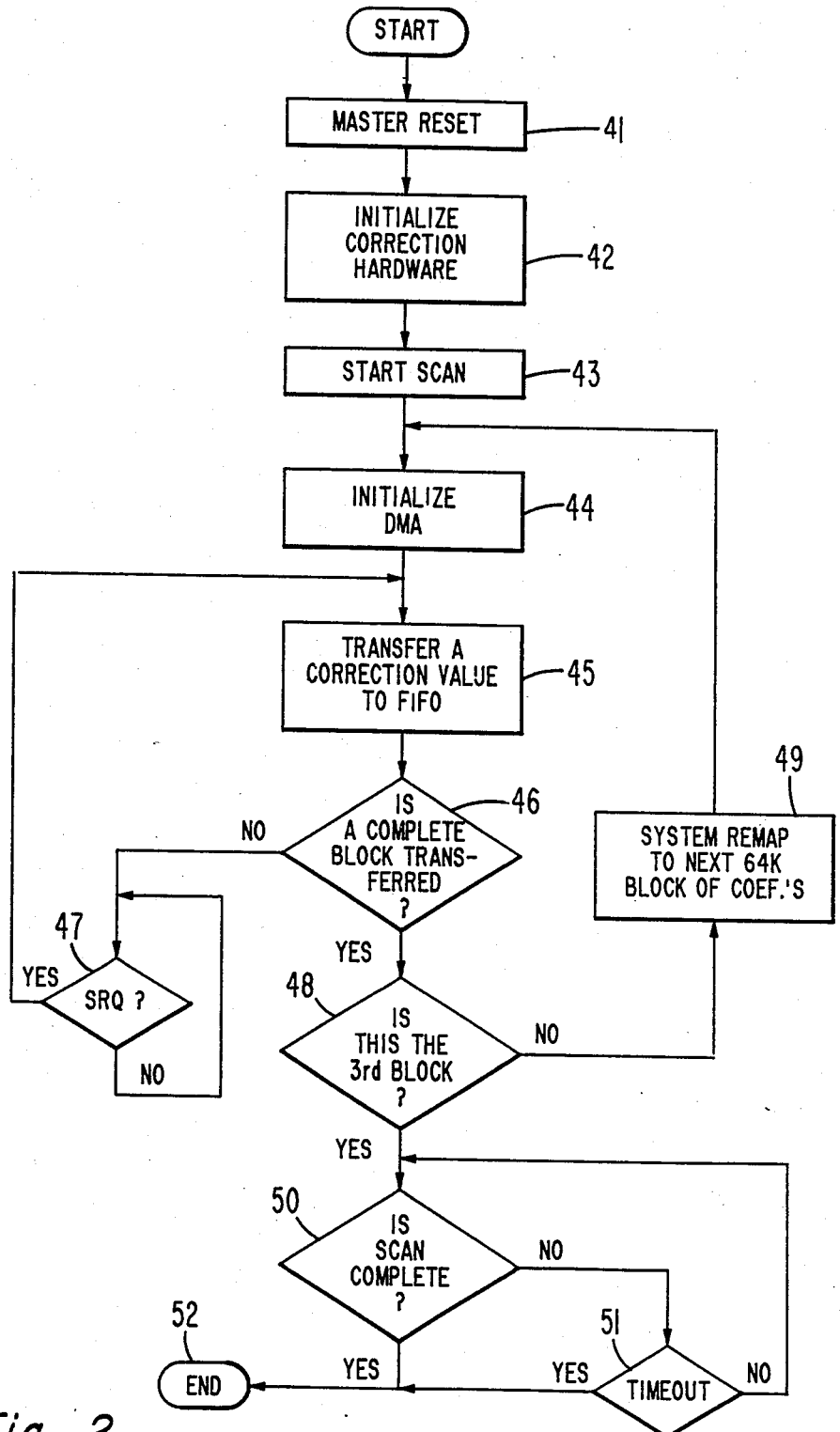
FIG. 2 is a flow chart of a preferred embodiment of the transfer of the stored correction values to the temporary storage mechanism.

FIG. 2 is a flow chart of the transfer of the correction values from the CPU 13 to the FIFO 21. The transfer begins at step 41 when a master reset signal is provided by the CPU to the processing system 10. At step 42, the correction hardware including the FIFO 21, correction control 22, multiplier 23 and multiplexer 24 are initialized as explained hereinabove. At step 43, the start signal on the output line 25 of the CPU 13 is provided to the system and the object being investigated is imaged onto the CCD of the camera 11. At step 44, direct memory access (DMA) is initialized to allow the actual transfer of data from the CPU 13 to the FIFO 21. At step 45, the actual transfer of a correction value $CV_N$ from the CPU 13 to the FIFO 21 occurs. In decision 46, a decision is made as to whether or not a complete block of data has been transferred from the CPU to the FIFO. For the exemplary CCD presented above, 163,840 correction values must be stored. These values are stored in the CPU 13 in three 64K byte blocks. Thus, the data can be stored as two blocks having 61,440 bytes and one block having 40,960 bytes. Decision 46 is used to determine whether or not one of these complete blocks has been transferred. When a complete block has not been transferred, decision 47 is entered to determine whether or not a request for service (SRQ) has been received. When the answer is yes, the CPU transfers the next correction value to the FIFO. When the answer is no, the CPU waits for the next SRQ. At decision 46 when a complete block of data has been transferred, decision 48 is entered to determine whether or not the third block has been entered. When the answer is no, step 49 is entered to remap the system for the next block of coefficients and the initialization of the direct memory access step 44 is reentered to transfer the subsequent block of data. At decision 48, when the third block of data has been transferred, decision 50 is entered to determine whether or not a complete scan has occurred. When it has, line 27 of FIG. 1 is high and the routine is ended at 52. When a complete scan has not occurred, decision 51 is entered to determine whether or not the time allotted for the transfer of data has expired. When it has, 52 is entered to end the routine. When it has not, decision 50 is reentered to check for end of scan.

Figure 3:
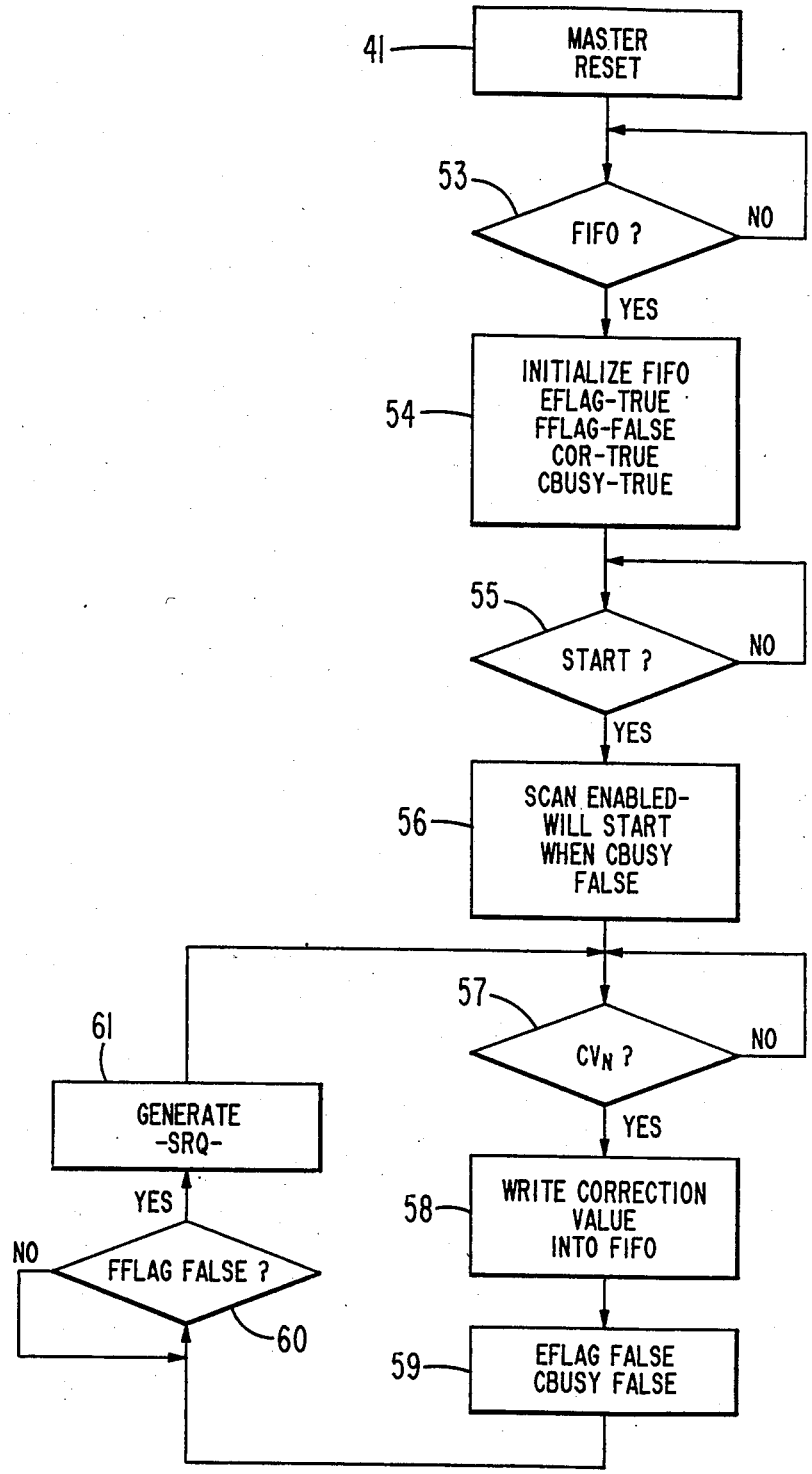
FIG. 3 is a flow chart of the temporary storage device.

FIG. 3 is a flow chart of the communication between the CPU 13 and the temporary storage unit FIFO 21. Step 41 is the same as step 41 of FIG. 2. Decision 53 indicates whether or not the FIFO has been initialized, and nothing occurs until it has. At step 54, the FIFO is initialized by setting the E flag true to indicate that the FIFO is empty. Also, the F flag is set false until the FIFO is full. The correction (COR) flag is set true to show select corrected pixel values at the MUX 24, rather than directing uncorrected values directly from the camera 11. The C-busy initialization is utilized to delay scan until at least one correction value is provided to the FIFO 21. Decision 55 is then entered and the system waits until a start indication is received from the central processing unit 13. When such a start signal is received, step 56 is entered and the correction routine will begin as soon as the C-busy flag goes false indicating that the FIFO 21 has received at least one correction value from the CPU 13. Decision 57 is then entered and a correction value is transferred to FIFO at step 58. At step 59, the E flag goes false because the FIFO is no longer empty and the C-busy flag goes false. Decision 60 is entered to determine whether or not the F flag is false to prevent the CPU from passing values to a full FIFO 21. Step 61 is then entered to provide the service request (SRQ) required by decision 47 of FIG. 2. Decision 57 is then reentered to pass the next correction value to the FIFO. This operation continues until all the correction values are transferred from the CPU 13 to the FIFO 21 at which time the routine waits for the a subsequent transfer of values to the FIFO, as indicated by master reset 41.

Figure 4:
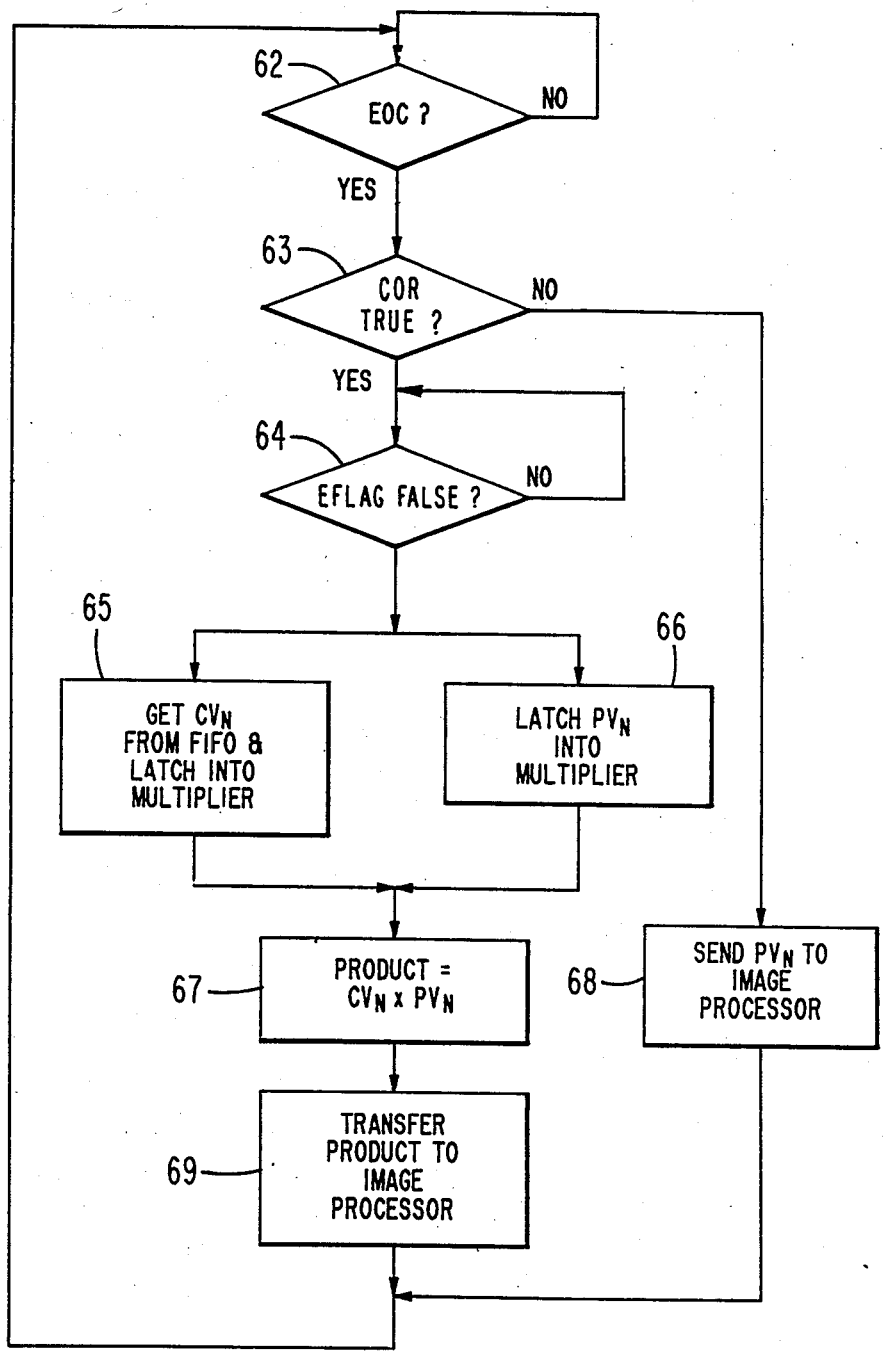
FIG. 4 is a flow chart showing the generation of the corrected pixel values and transfer to the image processor.

FIG. 4 is a flow chart of the method of communication between the FIFO 21 and the multiplier 23. At decision 62, a determination is made whether or not a pixel ready signal is available on the output line 26 of the CCD camera 11 (FIG. 1). When no such signal is present, nothing happens and the system merely sits there waiting for such a signal. When the CCD camera 11 produces a pixel ready signal, decision 63 is entered to determine whether the pixel values from the camera 11 are to be multiplied by correction values. When corrective values are not to be used, the pixel values are transferred directly to the image processor 14, at step 68. This is the operation when the correction values are being generated. When correction values are to be used, decision 64 is entered to determine whether or not the FIFO 21 is empty. When the FIFO is empty, the E flag is true, and the routine merely waits for the FIFO to receive a correction value from the CPU 13. When the first correction value is received by the FIFO 21, steps 65 and 66 are entered to provide a correction value $CV_N$ and a pixel value $PV_N$ to the multiplier 23. Step 67 is then entered to multiply the correction value and the pixel value to arrive at a corrected pixel value. Thus, the pixel value for every pixel is multiplied by the pixel correction value previously calculated for that pixel so that every pixel value is corrected by its own individual correction value. After the multiplication at step 67, step 69 is entered to transfer the corrected pixel value to the image processor 14. This multiplication and transfer continues until all 163,840 pixel values are corrected. However, the CPU 13 is free to perform other tasks as soon as the correction values are transferred to the FIFO 21.

The pixel correction values are derived prior to any attempt to utilize the system 11. Thus, after the system is installed and the CCD is ready for imaging, a preselected number of exposures, such as 30, are taken of a flat field using the CCD. All pixel values for all the exposures are summed together and a mean pixel value is obtained, defined as MEAN A. Also, the individual pixel values for each pixel, and for all exposures, are summed together and an individual mean value is obtained for each individual pixel e.g. mean for pixel 1, mean for pixel 2, etc. This mean is defined as MEAN N, where N represents the number of each pixel such as 1, 2, 3 . . . 163,840. The correction value $CV_N$ is then defined as $CV_n$ = MEAN A/MEAN N. These correction values are stored in the CPU 13 and are valid until the CCD camera is changed at which time new correction values must be determined.

What is claimed is:

1. A method of correcting for nonuniformities of the pixels of a charge coupled device (CCD) utilized in a system having a camera for imaging objects onto said CCD whereby the pixels of said CCD are charged to various pixel levels, comprising the steps of:

storing an individual correction value for every pixel of said CCD in a central processing unit (CPU);

transferring said pixel levels from said CCD to a multiplier;

temporarily storing said correction values in a temporary storage unit;

transferring said correction values from said temporary storage unit to said multiplier in synchronization with the transfer of said pixel levels whereby every pixel level is multiplied by an individual correction value to produce a corrected pixel value for every pixel of said CCD; and transferring said corrected pixel values to an image processing unit.

2. The method of claim 1 further including the step of transferring said pixel levels directly to said image processing unit when said correction values are to be generated.

3. The method of claim 2 wherein said correction values are transferred to said temporary storage unit in a plurality of separate data blocks.

4. The method of claim 3 wherein said correction values are calculated in accordance with:

$$CV_N = MEAN\ A/MEAN\ N$$

where:

$CV_N$ = correction value for a particular pixel
MEAN A = a mean pixel value obtained from all CCD pixels for a plurality of exposures
MEAN N = the mean pixel value for each particular pixel for a plurality of exposures.
N = pixel 1, pixel 2, etc.

5. The method of claim 1 wherein said correction values are transferred to said temporary unit in a plurality of separate data blocks.

6. The method of claim 5 wherein said correction values are calculated in accordance with:

$$CV_N = MEAN\ A/MEAN\ N$$

where:

$CV_N$ = correction value for a particular pixel
MEAN A = a mean pixel value obtained from all CCD pixels for a plurality of exposures
MEAN N = the mean pixel value for each particular pixel for a plurality of exposures.
N = pixel 1, pixel 2, etc.

7. An apparatus for correcting for nonuniformities of the pixels of a charge coupled device (CCD) within an imaging camera whereby each pixel of said CCD is charged to a pixel level comprising:

multiplier means for receiving said pixel values from said CCD;

temporary storage means for receiving pixel correction values from a control processing unit and for transferring said correction values to said multiplier in synchronization with the transfer of said pixel values to said multiplier whereby every pixel value is multiplied by an individual correction value to provide a corrected pixel value for every pixel of said CCD;

multiplexer means for receiving said corrected pixel values from said multiplier and for providing said corrected pixel values to a processing unit.

8. The apparatus of claim 7 further including correction control means for controlling said multiplier means and said temporary storage means.

* * * * *